June 26, 1934.  O. STÅLHANE ET AL  1,964,680
METHOD OF REDUCING OXIDE ORES OR THE LIKE BY MEANS OF GAS
Filed Sept. 22, 1932
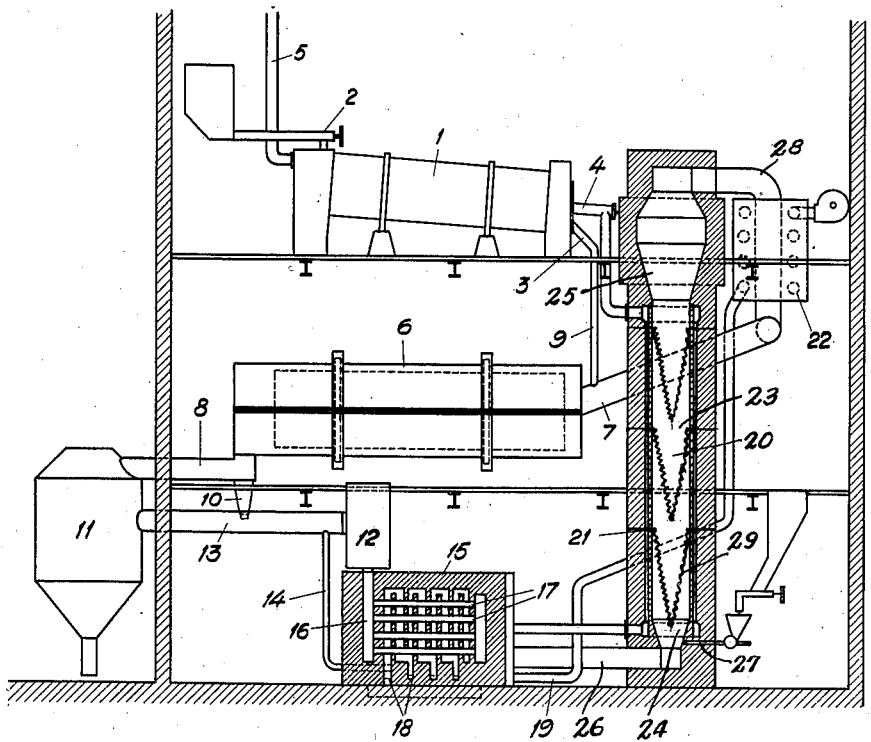
Inventors.
Otto Stålhane and
Johan Bertil Stålhane
per
Wm Willard White
Attorney.

Patented June 26, 1934

1,964,680

UNITED STATES PATENT OFFICE 1,964,680

METHOD OF REDUCING OXIDE ORES OR THE LIKE BY MEANS OF GAS

Otto Stålhane and Johan Bertil Stålhane, Stockholm, Sweden, assignors to Allmanna Svenska Elektriska Aktiebolaget, Vesteras, Sweden, a corporation of Sweden Application September 22, 1932, Serial No. 634,417
In Sweden September 23, 1931

1 Claim. (Cl. 75—75)

In reducing oxygen-containing ores by means of gaseous mixtures the essential reducing constituents of which consist of carbon monoxide, hydrocarbons or hydrogen, it has generally been found impossible to fully utilize the oxygen-binding capacity of such gases for the ore reduction proper, and a plurality of processes have therefore been proposed based upon the suggestion, that a substantial portion of the reducing gas be regenerated after the reduction process by again chemically absorbing carbon (recarburation), while the remainder is burned and its heat of combustion is utilized in one way or the other, among others for delivering heat to the regenerator or recarburetor which needs a rather large amount of heat. The hitherto proposed methods for this purpose have however failed, due essentially to the difficulty of transmitting the necessary heat to the recarburator at the high temperature which must prevail therein. According to the present invention the continuous reduction and recarburation process is conducted with so large a circulating gas quantity in proportion to the reduced substance, that the gas mixture is oxidized only to a very small extent at the reduction and therefore only need to be recarburated to such a small extent, that an essential part of the heat necessary for the recarburation can be transferred to the reduction gas from the burnt surplus gas and stored in the former before the recarburation.

The gas is thus, before the recarburation, passed through a special gas heater in which it is heated, by combustion of the surplus gas produced in the reduction, to a temperature between 1100° and 1200° centigrade. A considerably higher temperature cannot be attained in this way. The recarburation embraces only about 5%, and at any rate not more than 10%, of the total gas quantity, that is, only such a fraction of carbon dioxide or water vapor present therein is reduced to carbon monoxide or hydrogen by added carbon. The heat content of the gas at the aforesaid temperature is sufficient to cover a substantial portion of the heat demand for the carburation, so that only a minor part of heat need to be added in another way, for instance in an electrical way by means of resistance elements or arcs.

Preferably, the carbon dioxide content of the reducing gas before the reducing process is kept very low, for instance below 1%, so that after the reducing process it is of the order of magnitude of 5–10%. It has been found, that with such a composition of the reducing gas and with an iron ore sand or slime with small dimensions of the grains, for instance less than one fifth millimeter in diameter, the reduction can be accomplished in about a quarter of an hour or less, and the heat losses by radiation and convection can therefore be brought down to a small fraction of those which are unavoidable when the reduction takes several hours.

The preheating of the gas by the combustion of surplus gas is preferably effected continuously by heat transmission through walls, and the heat content remaining in the combustion gases can then be partially utilized for covering the heat losses of the recarburator by passing through a shell surrounding the latter. The finally remaining heat content can be used for covering the heat losses of the reduction furnace or for preheating ore or combustion air.

An installation for carrying out the invention is diagrammatically illustrated in a side view, partly in section, in the accompanying drawing. 1 is a preheating furnace for the ore sand with an inlet 2 and an outlet 3 for the same. This furnace is preferably built as a rotary furnace and provided with an inlet 4 and an outlet 5 for the heating gas. 6 is a rotary drum furnace for the reduction process which is provided with an inlet 7 for the gas mixture and an outlet 8. The outlet 3 for the pre-heated ore is connected with the gas inlet 7 by a pipe 9, and the reduced ore after passing through the furnace 6 is diverted from the gas through an outlet 10. 11 is a dust separator for separating that part of the reduced ore which tends to follow the gas current.

After the passage through the reducing furnace 6 the gas has a temperature of about 900° C. which at the passage through the dust separator falls to about 800° C. In order to raise the temperature of the gas to a temperature suitable for the carburation, the gas is pressed by a fan 12 into a reheating furnace 15, where the temperature of the gas is raised to between 1100° and 1300° C. This reheating furnace is heated by means of the combustion of surplus reduction gas diverted from the main gas conduit 13 by a pipe 14. This gas is burned in the furnace 15 for heating the main portion of the gas which passes through a chamber 16 and then through metal pipes 17 in the furnace 15 which are surrounded by the combustion gases from burners 18 in which a gradual combustion is effected by means of air arriving through the conduit 19. This air is preheated as further described below so that the temperature of combustion will be rather high, about 1300° C., and the main portion of the gas is heated to not less than 1100° and not more than 1300° C. A continuous heating of this gas forms an important feature of the invention, as distinguished from gas heating on the regenerative principle.

The heated gas from the furnace 15 passes through a tube 26 into a recarburator 20 and the combustion gases pass through a channel 21 in the shell of said recarburator for covering its heat losses and then to the gas inlet 4 of the ore preheating furnace. The gas from the recarburator, before being introduced into the reduction furnace 6, passes through an air preheater 22 for delivering part of its heat to the combustion air for the gas heater 15.

The recarburator 20 consists of a vertical shaft 23 of uniform cross-section throughout the main portion of its height, while at the lower end 24 and at the upper end 25 its walls taper so as to form hopper shaped structures, the lower end having the smallest and the upper end the largest cross-section. The gas enters through the said tube 26 at the lower end and escapes through a tube 28 at the upper end. Finally disintegrated carbon is introduced at the lower end by any suitable device such as a feeding screw at 27, and the speed of the gas current should be so high at this point, (for instance 10 meters per second) as to carry forth all the carbon grains. In the main portion of the shaft, the speed is so low that the larger grains practically remain at the same level until substantially reduced in diameter by the chemical reaction. The latter may be promoted by electrical heating devices 29. In the enlarged hopper at the upper end, the speed of the gas becomes so low that even the smallest carbon particles are not carried forth but remain in floating condition until entirely consumed. In order to obtain a mixture containing one per cent or less of carbon dioxide from a mixture originally containing five per cent carbon dioxide and the rest consisting of reducing gases, a temperature of 1100°–1200° C. should be maintained at least at the inlet.

We claim as our invention:—

A continuous process for reducing oxide iron ores comprising in combination, the passage of heated reducing carbonaceous gas initially containing one percent carbonic acid or less through pulverized ore having a grain size less than one fifth millimeter, proportioning the gas quantity to the ore quantity so as to raise the percentage of carbonic acid to not more than ten percent, separating after reduction the iron from the process, burning a portion of the gas corresponding to the increase in volume caused by the reduction process, heating the remainder of the gas by the heat of combustion, recarburizing said gas to a percentage of carbonic acid of substantially one percent or less by means of finely disintegrated carbon introduced thereinto, diverting a portion of the heat contents of said gas after recarburation for preheating combustion air for the surplus gas, and passing said gas through a fresh quantity of ore as above specified.

OTTO STÅLHANE.
JOHAN BERTIL STÅLHANE.